(12) United States Patent
Ketzer et al.

(10) Patent No.: US 9,685,646 B2
(45) Date of Patent: Jun. 20, 2017

(54) PASTING PAPER MADE OF GLASS FIBER NONWOVEN COMPRISING CARBON GRAPHITE

(71) Applicant: JOHNS MANVILLE, Denver, CO (US)

(72) Inventors: Michael Ketzer, Collenberg (DE); Gerold Albert, Erlenbach (DE); Zhihua Guo, Centennial, CO (US); Souvik Nandi, Highlands Ranch, CO (US); Jawed Asrar, Englewood, CO (US); Albert G. Dietz, III, Littleton, CO (US)

(73) Assignee: Johns Manville, Denver, CO (US)

( * ) Notice: Subject to any disclaimer, the term of this patent is extended or adjusted under 35 U.S.C. 154(b) by 262 days.

(21) Appl. No.: 14/489,093

(22) Filed: Sep. 17, 2014

(65) Prior Publication Data
US 2015/0099189 A1   Apr. 9, 2015

Related U.S. Application Data

(63) Continuation-in-part of application No. 14/045,579, filed on Oct. 3, 2013, and a continuation-in-part of application No. 14/048,771, filed on Oct. 8, 2013.

(51) Int. Cl.
*H01M 2/14* (2006.01)
*H01M 2/16* (2006.01)
(Continued)

(52) U.S. Cl.
CPC .......... *H01M 2/145* (2013.01); *H01M 2/162* (2013.01); *H01M 2/1613* (2013.01);
(Continued)

(58) Field of Classification Search
CPC .... H01M 2/145; H01M 2/1613; H01M 2/162; H01M 2/1626; H01M 2/1633;
(Continued)

(56) References Cited

U.S. PATENT DOCUMENTS

| | | |
|---|---|---|
| 4,216,280 A | 8/1980 | Kono et al. |
| 4,336,314 A | 6/1982 | Yonezu et al. |

(Continued)

FOREIGN PATENT DOCUMENTS

| | | |
|---|---|---|
| DE | 20 2004 020668 U1 | 1/2006 |
| EP | 2 390 947 A1 | 11/2011 |

(Continued)

*Primary Examiner* — Sarah A Slifka
*Assistant Examiner* — Brian Ohara
(74) *Attorney, Agent, or Firm* — Robert D. Touslee (57) ABSTRACT

Embodiments of the invention provide a lead-acid battery having a positive electrode, a negative electrode, and a separator positioned between the electrodes to electrically insulate the electrodes. Battery includes a nonwoven fiber mat positioned adjacent an electrode. Mat includes a mixture of first glass fibers having diameters between 8 μm to 13 μm and second glass fibers having diameters of at least 6 μm and a silane sizing. An acid resistant binder bonds the glass fibers to form mat. A wetting component is applied to increase the wettability such that mat exhibits an average water wick height of at least 1.0 cm after exposure to water for 10 minutes. A conductive material is disposed on a surface of mat such that when mat is adjacent an electrode, the conductive material contacts the electrode. An electrical resistance of less than 100,000 ohms per square enables electron flow about mat.

20 Claims, 4 Drawing Sheets

(51) Int. Cl.
  *H01M 4/14* (2006.01)
  *H01M 4/66* (2006.01)
  *H01M 4/80* (2006.01)
  *H01M 10/06* (2006.01)
  *H01M 10/16* (2006.01)

(52) U.S. Cl.
  CPC ....... *H01M 2/1626* (2013.01); *H01M 2/1633* (2013.01); *H01M 2/1673* (2013.01); *H01M 2/1686* (2013.01); *H01M 4/14* (2013.01); *H01M 4/663* (2013.01); *H01M 4/666* (2013.01); *H01M 4/806* (2013.01); *H01M 10/06* (2013.01); *H01M 10/16* (2013.01); *Y02T 10/7016* (2013.01); *Y10T 29/49108* (2015.01)

(58) Field of Classification Search
  CPC .... H01M 2/1673; H01M 2/1686; H01M 4/14; H01M 4/663; H01M 4/666; H01M 4/806; H01M 10/06; H01M 10/16
  See application file for complete search history.

(56) References Cited

U.S. PATENT DOCUMENTS

| | | | |
|---|---|---|---|
| 4,606,982 A | 8/1986 | Nelson et al. | |
| 4,873,157 A | 10/1989 | Flicker et al. | |
| 5,667,917 A | 9/1997 | Edwards et al. | |
| 6,677,073 B1* | 1/2004 | Brown | D04H 1/4242 429/481 |
| 2007/0259260 A1* | 11/2007 | Johns | H01M 2/1666 429/143 |
| 2008/0076028 A1 | 3/2008 | Miller et al. | |
| 2008/0190841 A1* | 8/2008 | Pascaly | B01D 67/0079 210/500.25 |
| 2011/0216476 A1 | 9/2011 | Fleischer et al. | |
| 2011/0293988 A1* | 12/2011 | Obernyer | H01M 4/20 429/144 |
| 2011/0318643 A1* | 12/2011 | Clement | H01M 4/14 429/247 |
| 2013/0273409 A1 | 10/2013 | Nandi et al. | |
| 2014/0038023 A1 | 2/2014 | Guo et al. | |

FOREIGN PATENT DOCUMENTS

| | | |
|---|---|---|
| FR | 2937799 | 4/2010 |
| GB | 824 025 A | 11/1959 |
| JP | H03 203158 A | 9/1991 |
| JP | H04 10353 A | 1/1992 |
| WO | 2011 019597 A1 | 2/2011 |
| WO | 2012/175269 A2 | 12/2012 |
| WO | 2012/177869 A2 | 12/2012 |
| WO | 2013/053957 A1 | 4/2013 |

* cited by examiner

PASTING PAPER MADE OF GLASS FIBER NONWOVEN COMPRISING CARBON GRAPHITE

CROSS-REFERENCES TO RELATED APPLICATIONS

This application is a continuation in part application and claims the benefit of copending U.S. patent application Ser. No. 14/045,579, filed, Oct. 3, 2013, and U.S. patent application Ser. No. 14/048,771, filed Oct. 8, 2013, the complete disclosures of which are herein incorporated by reference.

BACKGROUND OF THE INVENTION

Lead-acid batteries are characterized as being inexpensive and highly reliable. As such, they are widely used as an electrical power source for starting motor vehicles, golf carts, and other electric vehicles. In recent years, a variety of measures to improve fuel efficiency have been considered in order to prevent atmospheric pollution and global warming. Examples of motor vehicles subjected to fuel-efficiency improvement measures that are being considered include idling stop vehicles (ISS vehicles) where the engine is stopped when the vehicle is not in motion to prevent unnecessary idling of the engine and to reduce engine operation time.

In an ISS vehicle, the number of engine startup cycles is higher, and the lead-acid battery discharges a large electrical current during each startup. In addition, the amount of electricity generated by the alternator in an ISS vehicle is smaller, and the lead-acid battery is charged in an intermittent manner. As such, charging of the battery is often insufficient. Stated differently, the battery is in a partially charged state known as a PSOC (i.e., partial state of charge). Accordingly, a lead-acid battery used in an ISS vehicle is required to have a capability in which the battery is charged as much as possible in a relatively short time. In other words, the lead-acid battery should have a higher charge acceptance. Therefore, improvements in the charge acceptance of a lead-acid battery are desired.

Lead-acid batteries typically have a shorter lifespan when used under PSOC than in an instance in which the battery is used in a fully charged state. One reason for the shorter lifespan under PSOC is believed to be due to repeatedly charging and recharging the battery in an insufficiently charged state. Charging and recharging the battery in this manner negatively affects the battery's electrodes or plates. For example, lead sulfate forms on the negative plate during discharge and undergoes progressive coarsening during charging and tends not to return to metallic lead. Improving the charge acceptance may prevent the battery from being charged and recharged in an insufficiently charged state, which may inhibit coarsening of lead sulfate due to repeated charging/discharging. This may increase the life span of the lead-acid battery.

In addition, there are inherent disadvantages to lead-acid batteries. For example, during discharge of the lead-acid battery, the lead dioxide (a fairly good conductor) in the positive plate is converted to lead sulfate (an insulator). The lead sulfate can form an impervious layer encapsulating the lead dioxide particles which limits the utilization of lead dioxide often to less than 50 percent of capacity, and more commonly around 30 percent. The low percentage of usage is a key reason why the power and energy performance of a lead-acid battery is inherently less than optimum. It is believed that this insulator layer leads to higher internal resistance for the battery. Improving the charge acceptance may also help reduce issues associated with formation of lead sulfate. In addition, lead-acid batteries having a separator typically exhibit a voltage drop when operated in cranking cycles at low operating temperatures (multiple starting procedures). This disadvantage hinders the acceptance of such battery systems for a broader use.

BRIEF SUMMARY OF THE INVENTION

The embodiments described herein provide nonwoven fiber mats that can be used to reinforce plates in lead-acid batteries and/or that have an electrically conductive surface that enhances electron flow from the battery plates. The nonwoven fiber mats described herein may improve the charge acceptance of a lead-acid battery in addition to reinforcing the battery's plates or electrodes. The nonwoven mats described herein may also offer a significant improvement (decrease) of the voltage drop when operated in cranking cycles at low operating temperatures (multiple starting procedures) if compared to existing systems. According to one embodiment, a lead-acid battery is provided. The lead-acid battery may include a positive electrode, a negative electrode, a separator positioned between the positive electrode and the negative electrode to electrically insulate the positive and negative electrodes, and a nonwoven fiber mat (reinforcement mat) that is positioned adjacent either the positive electrode or the negative electrode to reinforce the positive or negative electrode. The battery may also include a nonwoven fiber mat that is used to reinforce the separator. The reinforcement mat may include a relatively homogenous mixture of coarse glass fibers. The mixture of coarse glass fibers may include a plurality of first glass fibers having diameters between about 8 µm to 13 µm and a plurality of second glass fibers having diameters of at least 6 µm. In some embodiments, the diameter of the second glass fibers is between about 6 µm and 7 µm. The plurality of second glass fibers may include a silane material coating or sizing. The silane sizing of glass fibers may improve the acid resistance of the fibers. In addition, the silane sizing improves the wicking behavior of the fibers as compared to non-sized fibers.

The nonwoven fiber mat may further include an acid resistant binder that bonds the plurality of first and second glass fibers to form the nonwoven fiber mat. The nonwoven fiber mat may include a wetting component applied to the nonwoven fiber mat to increase the wettability of the nonwoven fiber mat such that the nonwoven fiber mat has or exhibits an average water wick height of at least 1.0 cm after exposure to water for 10 minutes conducted according to method ISO8787. The nonwoven fiber mat may further include a conductive material that is disposed on at least one surface of the nonwoven fiber mat or throughout the nonwoven fiber mat such that when the nonwoven fiber mat is positioned adjacent the positive or negative electrode, the conductive material contacts the positive or the negative electrode. The nonwoven fiber mat may have an electrical resistance of less than about 100,000 ohms per square so as to enable electron flow about the nonwoven fiber mat.

In some embodiments, the mixture of coarse glass fibers may include between about 10% to 95% of the first glass fibers and between about 5% to 80% of the second glass fibers. In some embodiments, the nonwoven fiber mat may have an area weight of between about 10 g/m² and about 100 g/m². In some embodiments, the wetting component may include one or more of cotton fibers, cellulose fibers, or polyester fibers that are bonded with the nonwoven fiber mat. In some embodiments, the one or more of cotton fibers, cellulose fibers, or polyester fibers may form a mat that is bonded to at least one side of the nonwoven fiber mat. In some embodiments, the one or more of cotton fibers, cellulose fibers, or polyester fibers may be entangled with the mixture of coarse glass fibers to form the nonwoven fiber mat.

In some embodiments, the binder may include a plurality of conductive fibers and/or conductive particles. For example, the conductive material may include graphite powder and/or a plurality of carbon fibers that are entangled with the mixture of coarse glass fibers of the nonwoven mat.

According to another embodiment, a nonwoven fiber mat for a lead-acid battery is provided. The nonwoven fiber mat may include a relatively homogenous mixture of coarse glass fibers. The mixture of glass fibers may include a plurality of first glass fibers having diameters between about 8 μm to 13 μm and a plurality of second glass fibers having diameters of at least 6 μm, preferably 6 μm to 7 μm. The plurality of second glass fibers may include a silane material sizing. The nonwoven fiber mat may also include an acid resistant binder material that bonds the plurality of first and second glass fibers to form the nonwoven mat. The nonwoven fiber mat may include a wetting component applied to the nonwoven fiber mat to increase the wettability of the nonwoven fiber mat such that the nonwoven fiber mat has or exhibits an average water wick height of at least 1.0 cm after exposure to water for 10 minutes conducted according to method ISO8787. The nonwoven fiber mat may further include a conductive material that is disposed on at least one surface of the nonwoven fiber mat or throughout the nonwoven mat such that when the nonwoven fiber mat is positioned adjacent a positive or a negative electrode of a lead-acid battery, the conductive material contacts the positive or negative electrode. The nonwoven fiber mat may have an electrical resistance of less than about 100,000 ohms per square to enable electron flow on a surface of the nonwoven fiber mat.

In some embodiments, the nonwoven fiber mat may have an area weight of between about 20 g/m² and about 60 g/m². In some embodiments, the wetting component may include cotton fibers having diameters between about 0.1 μm to 10 μm. In some embodiments, the nonwoven fiber mat may include between about 70% to 95% of the mixture of coarse glass fibers and between about 5% to 30% of the binder. In some embodiments, the mixture of coarse glass fibers may include between about 10% to 95% of the first glass fibers and between about 5% to 80% of the second glass fibers. In some embodiments, the conductive material may further include carbon fibers that are between about 8 mm to 12 mm in length and having diameters between about 6 μm to 10 μm. In some embodiments, the binder may include one or more of acrylic, melamine, phenolic, and urea formaldehyde (UF) binder, and/or any mixture thereof.

According to another embodiment, a method of manufacturing a nonwoven fiber mat for use in a lead-acid battery is provided. The method may include providing a mixture of coarse glass fibers. The mixture of coarse glass fibers may include a plurality of first glass fibers having diameters between about 8 μm to 13 μm and a plurality of second glass fibers having diameters of about 6 μm, preferably 6 μm to 7 μm. The plurality of second glass fibers may include a silane material sizing. The method may include applying an acid resistant binder to the mixture of coarse glass fibers to couple the mixture of coarse glass fibers together to form the nonwoven fiber mat. The method may also include applying a conductive material to at least one surface of the nonwoven fiber mat or throughout the nonwoven fiber mat such that when the nonwoven fiber mat is positioned adjacent a positive or a negative electrode of a battery, the conductive material contacts the positive or the negative electrode. The nonwoven fiber mat may have an electrical resistance of less than about 100,000 ohms per square so as to enable electron flow about the nonwoven fiber mat. The method may further include applying a wetting component to the nonwoven fiber mat to increase the wettability of the nonwoven fiber mat such that the nonwoven fiber mat has or exhibits an average water wick height of at least 1.0 cm after exposure to water for 10 minutes conducted according to method ISO8787.

In some embodiments, applying the wetting component may include bonding one or more of cotton fibers, cellulose fibers, or polyester fibers with the mixture of coarse glass fibers of the nonwoven fiber mat. In some embodiments, the conductive material includes one or more of graphite particles or carbon fibers.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the invention provide nonwoven fiber mats (hereinafter reinforcement mat) that have an electrically conductive surface that enhances electron flow to and/or from the battery plates, as well as including a wetting component to improve the wettability of the mats. The reinforcement mats may be used to reinforce plates in lead-acid batteries, or other batteries, or used on separators positioned between electrodes, e.g. in Absorptive Glass Mat (AGM) battery applications. The reinforcement mats can be any woven or, preferably, any nonwoven mat which is acid resistant, such as glass mat, or mat made from mainly polyolefin fibers, or mixture of polyolefin and glass fibers.

In some embodiments, the electron flow is enhanced by providing a mat having a conductive surface or surfaces and/or other conductive pathway. The enhanced electron flow extends the battery's life, especially in lead acid batteries where continual discharge and recharge of the battery results in degradation of the battery's electrodes. For example, during discharge of the lead acid battery, lead dioxide (a good conductor) in the positive electrode plate is converted to lead sulfate, which is generally an insulator. The lead sulfate can form an impervious layer or layers encapsulating the lead dioxide particles, which may limit the utilization of the lead dioxide, and thus the battery, to less than 50 percent of capacity, and in some cases about 30 percent. The insulative lead sulfate layer may also lead to higher resistance for the battery. The effect may be a decrease in the electrical current provided by the battery and/or in the discharge life of the battery. In some embodiments, the mat may offer a significant improvement (decrease) of the voltage drop when operated in cranking cycles at low operating temperatures (multiple starting procedures) if compared to existing systems. Conductive reinforcement mats may replace other plate reinforcement means, such as paper, that are currently used in lead-acid or other batteries. The conductive reinforcement mat provides several advantages over the current plate reinforcement means, such as not dissolving in the electrolyte (e.g., sulfuric acid); providing vibration resistance, reducing plate shedding, strengthening or reinforcing the plate; and/or providing good dimensional stability, which may allow easier guiding or handling during battery plate manufacturing processes.

In regards to the conductive properties of the conductive reinforcement mat, the electrically conductive surface of the mat may provide an additional route for electron flow. The route provided by the mat is typically separate from the route provided by the conductor plate or grid of the battery. The multiple electron paths (e.g., the mat and conductor plate) allows the electrons to flow via either or both the conductive reinforcement mat or the conductor plate/grid depending on which route provides the least electrical resistance. In this manner, as the electrode degrades due to formation of lead sulfate, numerous routes for the electrons are maintained, thereby extending the overall life of the battery. In some embodiments, the battery may include a battery separator that also includes a conductive material. The battery separator may provide extra electron flow routes in addition to the fiber mat and conductor plate or grid. Such a separator may be particularly useful in AGM batteries discussed herein. In some embodiments, the separator may include a non-conductive separating layer.

The conductive reinforcement mat also provides excellent plate or electrode reinforcement due to their excellent strength properties. The conductive reinforcement mat may also have a relatively small or decreased mat size. The relatively thin fiber mats reduce the overall volume that the mat occupies, which allows an increased amount of electrolyte and/or active material paste to be used within the lead-acid battery. The thinner mats also improve processing efficiency by increasing the mat footage on the processing rolls, which reduces the frequency of roll changing. In some embodiments, the conductive reinforcement mat may be less than 10 mils thick (i.e., 0.010 inches or 254 µm), and more commonly less than 9 mils thick (i.e., 0.009 inches). In one embodiment, the conductive reinforcement mat is about 6 mils and 8 mils or between about 6 mils and 7 mils thick.

In some embodiments, the conductive reinforcement mats may include a combination of electrically insulative fibers and a conductive material. The mat made of these electrically insulative fibers may have an electrical resistance greater than about 1 million ohms per square (sheet resistance). In one embodiment, the electrically insulative fibers may include glass fibers, polyolefin fibers, polyester fibers, and the like. For convenience in describing the embodiments, the disclosure herein will describe mainly glass fibers, although it should be realized that other electrically insulative fibers may be used.

The electrically conductive material may include a layer or mat of conductive fibers or a layer of other conductive materials, such as a metallic sheet or film that is positioned atop the electrically insulative fiber layer. In many embodiments, the conductive material is a non-metal material. In some embodiments, the conductive material may include a coating of conductive material applied to or atop the fiber mat. In a specific embodiment, the conductive material may be added to a binder material that is applied to the plurality of insulative fibers during manufacture of the fiber mat, or that is sprayed atop a previously manufactured fiber mat. The conductive material may include conductive polymers (e.g., polyanilines), carbon material (e.g., carbon black, activated carbon, graphite, carbon nanofibers, carbon nanotubes, graphene, CNS (carbon nanostructure)), and the like. In a specific embodiment, the conductive material may include conductive fibers that are disposed at least partially within and/or entangled with a fiber mat having the insulative fibers. The conductive fibers may be mixed with the insulative fibers (e.g., glass fibers, polymeric fibers, and the like) to make a mat that is conductive. In an exemplary embodiment, graphene or CNS may be used due to their high electrical conductivity and inertness to sulfuric acid. CNS may be more commonly used since it can be readily dispersed in water.

The conductive reinforcement mat is typically positioned within the battery so that the electrically conductive material/layer contacts the active paste of the battery's electrodes. The conductive layer mat may be disposed across substantially the entire surface of the conductive reinforcement mat so that the electrically conductive layer is substantially equal in size and shape to the conductive reinforcement mat. In this manner the electrically conductive layer provides a large conductive surface that contacts the electrode.

The conductive reinforcement mats may have a total tensile strength of at least 30 lbs/3 inch and more commonly at least 35 lbs/3 inch. To achieve this tensile strength, the nonwoven fiber mat may have a tensile strength in the machine direction of at least 22 lbs/3 inch and a tensile strength in the cross-machine direction of at least 13 lbs/3 inch. The description of "lbs/3 inch" generally refers to a method of testing the mat strength where a 3 inch by 12 inch rectangular piece of the fiber mat is subjected to a tensile stress until the mat fails, such as by ripping or tearing. Mats having tensile strengths less than 22 lbs/3 inch in the machine direction and less than 13 lbs/3 inch in the cross-machine direction may not have sufficient strength to withstand winding and rewinding during processing and/or to reinforce plates of a lead-acid or other battery.

In some embodiments, the conductive reinforcement mats may include a blend of two or more different sized coarse diameter fibers. The description of coarse diameter fibers generally includes fibers ranging in diameter between about 6 μm and about 30 μm in one embodiment, and between about 8 μm and about 20 μm in another embodiment. For example, in one embodiment, a conductive reinforcement mat may include a blend of first glass fibers having fiber diameters in the range of between 8 μm and 13 μm and second glass fibers having fiber diameters at least about 6 μm. The preferred diameter range is between 6 μm and 7 μm. In some embodiments, the second glass fibers may include a silane material sizing to provide increased adhesive properties and/or acid resistance. In one embodiment, the nonwoven fiber mats include at least 25% of each of the first and second glass fibers. The glass fibers typically have fiber lengths that range between about ⅓ of an inch to about 1½ inches, although fiber lengths are more commonly about ⅓ inch to ¾ inch or 1 inch.

The conductive reinforcement mats also include a binder that bonds the glass fibers together, and that bonds the conductive fibers to the glass fibers when conductive fibers are employed as the conductive material. The binder is typically applied to the glass fibers so that the binder comprise between about 5% and 45% by weight of the conductive reinforcement mats, between about 15% and 35% by weight of the conductive reinforcement mats, and more commonly comprises between about 5% and 30% by weight of the conductive reinforcement mats. The binder is generally an acid and/or chemically-resistant binder (e.g., an acrylic binder) that delivers the durability to survive in the acid environment throughout the life of the battery and the strength to survive the plate pasting operation. In a specific embodiment, the binder may also include the conductive material. For example, the conductive material (e.g., grapheme, graphite powder, and the like) may be dispersed within the binder.

According to one embodiment, a fiber mat (e.g., glass fiber mat) may be coated with the conductive material to form the conductive reinforcement mat. This may be achieved via dip-coating, curtain coating, spraying, dip-and-squeeze techniques, and the like. In another embodiment, the conductive material may be mixed with the binder and applied on the fiber mat during the binder application. The latter process represents a "one-step" or single application process. The binder may help bond the conductive material to the mat. Having described several embodiments of the invention, additional aspects will be more apparent with reference to the figures described below.

In some embodiments, the conductive material of the reinforcement mat may be non-metal. The non-metal conductive material coated mat may be used for reinforcing electrode plates and can provide benefits described herein, such as improving electron transfer and current output, reducing internal resistance of the battery, improving charging acceptance, and the like. It is believed that by using a non-metal conductive material coated mat either as a separator support mat or plate reinforcement mat, the electrons do not have to go through the electrode spot where a higher resistance exists (e.g., due to micro-cracks and the like). The electrons can flow freely on the conductive surface of the mat and choose the contacting spot having minimum resistance. This benefit becomes more pronounced after the battery is used for an extend period of time.

In addition to having conductive properties, reinforcement mats can also provide a wicking capability to allow a complete wetting of the electrodes. Such mats may also aid in the drying of the plate/electrode after the plate/electrode is pasted with a lead paste slurry. The term "wettability" as used herein refers to the mats ability to wick or otherwise transport water and/or other solutions, such as a water and acid solution, from a location. For example, in testing the wettability or wickability of glass fiber mats, a strip of the mat, which is often about 1 inch in width, 6 inches long, and typically 0.1-3 mm thick, may be dipped vertically in water or another solution for a given amount of time, such as 10 minutes. The distance or height the water absorbs within the glass fiber mat from a surface of the water or other solution indicates the mat's ability to wick or otherwise transport the water or solution. The test to determine the average water wick height of the reinforcement mat may be conducted according to method ISO8787. In some embodiments, the wicking capability may also improve the wetting of the electrode with electrolyte.

The mats described herein increase the wettability of glass fiber mats by adding a wetting component to the glass fiber mats. The added wetting component provides an avenue for the water and/or water/acid solution to evaporate. In one embodiment, the added wetting component aids in the transport of water and/or water/acid solution to a surface of the mat where the water and/or water/acid solution may evaporate. In some embodiments, the combination of the first glass fibers, second glass fibers, and wetting component may provide 4-5 times the wettability of a standard mat.

In one embodiment, the added wetting component may be a wettable component of an acid resistant binder that is used to bond the glass fibers of the mat together. The wettable component may be a hydrophilic functional group that increases the ability of the water and/or water/acid solution to absorb within the glass mat or flow along a surface of the glass mat. In other embodiments, wettable component may be a hydrophilic binder that is blended or combined with the acid resistant binder to form a binder mixture. In some embodiments, the wettable component may include starch, cellulose, stabilized cotton, a hydrophilic binder (e.g., a poly acrylic acid based binder) and the like. In some embodiments, the binder may protect the wettable component, such as cotton, from deterioration. In some embodiments, the glass mat may include only coarse glass fibers, or fibers having a fiber diameter of between about 6 and 30 µm. The wettable component may increase such mat's ability to absorb the water and/or water/acid solution and/or allow the water and/or water/acid solution to flow essentially along a surface of the reinforcement mat.

As used herein, the term hydrophilic (or acidophilic) binder refers to a binder having a contact angle with water (or a 33 wt. % sulfuric acid medium for acidophilic) of less than about 90°, preferably less than 70°, and most preferably less than 50°. In testing the contact angle of the binder, the binder may be spin-coated on a glass slide and then cured before being exposed to the above solution to measure the contact angle.

In some embodiments, the binder and wettable component may be added to the mat up to about 20% LOI (Loss on Ignition). In other embodiments, a first binder that does not include a wettable component may be used to bond the coarse glass fibers, and a second binder having the wettable component (e.g., a hydrophilic functional group) may be applied to the mat to increase the wettability of the mat. The first and second binders may be mixed or combined together to form a single binder mixture that is applied to the coarse glass fibers.

In another embodiment, the added wetting component may be a fiber. The fiber may be a natural fiber, such as cellulose or stabilized cotton, or can be a synthetic fiber such as polyester, or can include a mixture of natural and/or synthetic fibers (hereinafter component fibers). Stabilized cotton include cotton filaments that are coated with an acid resistant binder and/or embedded in such a binder. The component fibers may have a microfiber structure, or in other words may have fiber diameters between about 0.01 and 10 µm, more often between about 0.5 and 3 µm. The wickability/wettability of the component fibers may be better than the glass fibers (e.g., coarse fibers in the range of 6-30 µm) due to the dimensions of the fibers (e.g., microfibers) and/or because the component fibers typically include hydrophilic functional groups, such as OH groups, COOH groups, and the like.

In some embodiments, the component fibers may be formed into a mat that is separate from the mat of glass fibers, such as by applying the component fibers atop a glass fiber mat. The component fiber mat may be bonded with the glass fiber mat so that the resulting combined mat has essentially two layers—a layer of glass fibers and a layer of component fibers. In some embodiments, a second component fiber mat may be bonded to an opposite side of the glass fiber mat so that the resulting combined mat has essentially three layers—a glass mat sandwiched between two component fiber mats. In another embodiment, the component fibers may be mixed with the glass fibers so that the resulting mat includes a combination of entangled glass fibers and component fibers. An acid resistant binder may be used to bond the component fiber mat with the glass fiber mat, or may be used to bond the entangled glass fibers and component fibers to form the reinforcement mat.

In one embodiment, the glass fiber mat may include mainly coarse fibers, or fibers having a fiber diameter of between about 6 and 30 µm. In some embodiments, other acid resistant fibers may be used instead of glass including polyethylene fibers, polypropylene fibers, polyester fibers, and the like. The component fibers (e.g. cellulose fibers) provide the reinforcement mat with good wetting properties by aiding in the transport of water and or a water/acid solution to the surface of the reinforcement mat where the water and/or water/acid solution may evaporate.

In another embodiment, the glass fiber mat may include mainly glass microfibers, or fibers having a fiber diameter of between about 0.01 and 5 µm. The resulting reinforcement mat may include mainly or only glass microfibers that are entangled with the components fibers, or that are bonded with a component fiber mat(s). Such a reinforcement mat may have exceptional wetting and wicking capabilities.

In some embodiments, the reinforcement mat may include a combination of coarse acid resistant fibers (e.g., fibers having a fiber diameter of between 6 and 30 µm), acid resistant microfibers (e.g., fibers having a fiber diameter of between 0.01 and 5 µm), and the component fibers. The acid resistant coarse fibers and microfibers are commonly glass fibers, although other acid resistant fibers may be used. In some embodiments, the reinforcement mat may include between about 15-85% of the combination of glass coarse and microfibers, and between about 15-85% of the component fibers. In another embodiment, the reinforcement mat may include between about 40-60% of the coarse glass fibers, 20-30% of the glass microfibers, and 20-30% of the component fibers. The component fibers and microfibers may function synergistically to wick water and/or the water/acid solution, and thus, may greatly improve the wettability/wickability of the reinforcement mat. For example, glass microfibers are typically more wettable than coarse glass fibers. The microfibers, however, may be covered or concealed by the coarse glass fibers and/or binder and, thus, not exposed to the water and/or water/acid solution.

In some embodiments, the binder having the wettable component (e.g., a hydrophilic functional group) may be used to bond a reinforcement mat that includes the coarse glass and component fibers, or that includes the coarse glass fibers, glass microfibers, and component fibers. The wettable component may further increase the wettability of the reinforcement mats, such as by providing another avenue for transport of the water and/or water/acid solution and/or by increasing the exposure of the water and/or water/acid solution to the glass microfibers.

In another embodiment, the added wetting component may be a wettable solution that is added to the reinforcement mat. The wettable solution may be added to the reinforcement mat so as to saturate the reinforcement mat, or so as to be disposed on at least one surface of the reinforcement mat after drying of the wettable solution. The wettable solution may include a starch solution, cellulose solution, polyvinyl alcohol solution, polyacrylic acid solution, and the like. The wettable solution may be added to the mat after the mat is formed, such as by dip-coating the reinforcement mat in the wettable solution, or by applying the wettable solution via spray coating, curtain coating, and the like. After application of the wettable solution, the wettable solution may be dried to provide an avenue for the water and/or water/acid solution to evaporate. The wettable solution may subsequently dissolve when exposed to an acid environment, such as the environment of the battery's electrolyte, so that the reinforcement mat remains adjacent the electrode after dissolving of the wettable solution.

According to any of the embodiments described herein, the addition of the wetting component to the reinforcement mat may increase the wettability of the reinforcement mat such that the reinforcement mat exhibits an average water wick height of at least 1.0 cm after exposure to water for 10 minutes. The test to determine the average water wick height of the reinforcement mat may be conducted according to method ISO8787. Similarly, the addition of the wetting component to the reinforcement mat may enable the reinforcement mat to exhibit an average water/acid solution wick height of at least 1.0 cm after exposure to the water/acid solution for 10 minutes. This test is similarly conducted according to method ISO8787. In other embodiments, the average water wick height and/or water/acid solution wick height may be at least 0.8 cm after exposure to the respective solution for 10 minutes. In yet other embodiments, the average water wick height and or water/acid solution wick height may be greater than 1 cm after exposure to the respective solution for 10 min. As briefly described above, the addition of silane sized glass microfibers to the reinforcement mat may significantly increase the wettability/wickability of the reinforcement mat such that the average water wick height and/or water/acid solution wick height increases.

EMBODIMENTS

Figure 1:
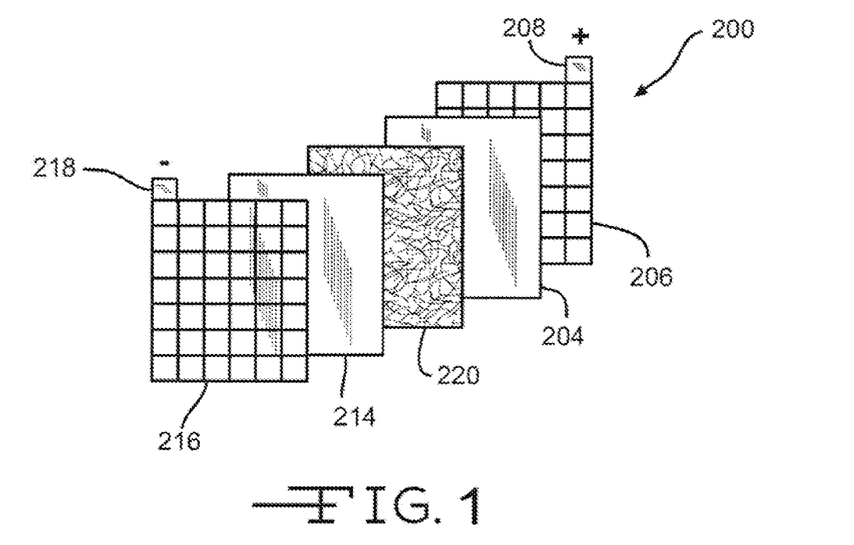
FIG. 1 illustrates an exploded perspective view of a battery cell assembly.
Figure 2:
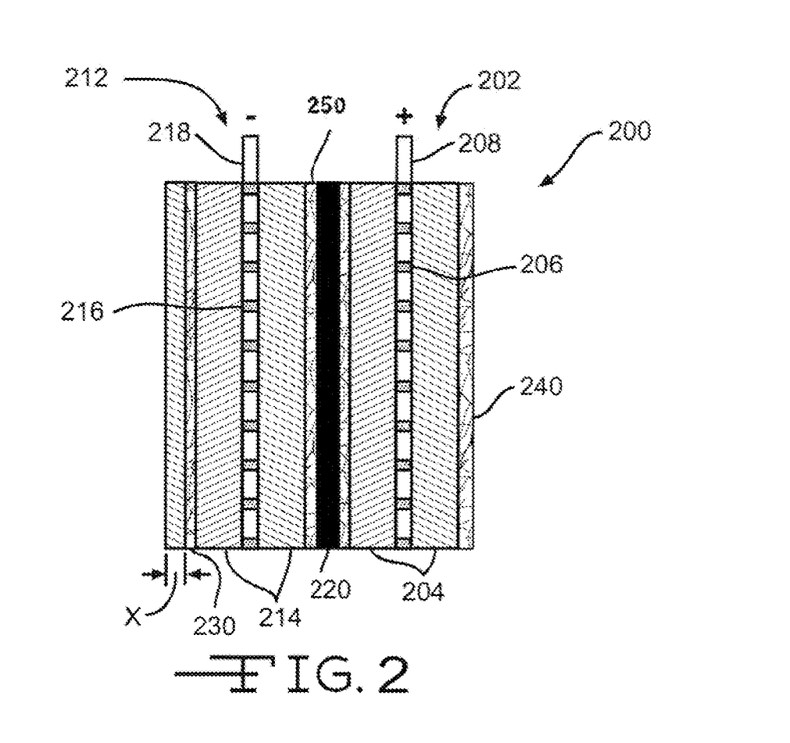
FIG. 2 illustrates an assembled cross section view of the battery cell assembly of FIG. 1.

FIGS. 1 and 2, respectively, show a perspective exploded view of a lead-acid battery cell 200 and a cross-section assembled view of the lead-acid battery cell 200. The lead-acid batter cell 200 may represent a cell used in either flooded lead-acid batteries or Absorptive Glass Mat (AGM) batteries. Each cell 200 may provide an electromotive force (emf) of about 2.1 volts and a lead-acid battery may include 3 such cells 200 connected in series to provide an emf of about 6.3 volts or may include 6 such cells 200 connected in series to provide an emf of about 12.6 volts, and the like. Cell 200 includes a positive plate or electrode 202 and a negative plate or electrode 212 separated by battery separator 220 so as to electrically insulate the electrodes 202 and 212. Positive electrode 202 includes a grid or conductor 206 of lead alloy material. A positive active material 204, such as lead dioxide, is typically coated or pasted on grid 206. Grid 206 is also electrically coupled with a positive terminal 208. Grid 206 provides structural support for the positive active material 204 along with electrical conductivity to terminal 208.

Likewise, negative electrode 212 includes a grid or conductor 216 of lead alloy material that is coated or pasted with a negative active material 214, such as lead. Grid 216 is electrically coupled with a negative terminal 218. Like grid 206, grid 216 structurally supports the negative active material 214 along with providing electrical conductance to terminal 218. In flooded type lead-acid batteries, positive electrode 202 and negative electrode 212 are immersed in an electrolyte (not shown) that may include a sulfuric acid and water solution. In AGM type lead-acid batteries, the electrolyte is absorbed and maintained within battery separator 220. Battery separator 220 is positioned between positive electrode 202 and negative electrode 212 to physically separate the two electrodes while enabling ionic transport, thus completing a circuit and allowing an electronic current to flow between positive terminal 208 and negative terminal 218. Separator 220 typically includes a microporous membrane (i.e., the solid black component), which is often a polymeric film having negligible conductance. The polymeric film may include micro-sized voids that allow ionic transport (i.e., transport of ionic charge carriers) across separator 220. In one embodiment, the microporous membrane or polymeric film may have a thickness of 50 micrometers or less, and preferably 25 micrometers or less, may have a porosity of about 50% or 40% or less, and may have an average pore size of 5 micrometers or less and preferably 1 micrometer or less. The polymeric film may include various types of polymers including polyolefins, polyvinylidene fluoride, polytetrafluoroethylene, polyamide, polyvinyl alcohol, polyester, polyvinyl chloride, nylon, polyethylene terephthalate, and the like. Separator 220 may also include one or more fiber mats that are positioned adjacent one or both sides of the microporous membrane/polymeric film to reinforce the microporous membrane and/or provide puncture resistance.

Figure 3A:
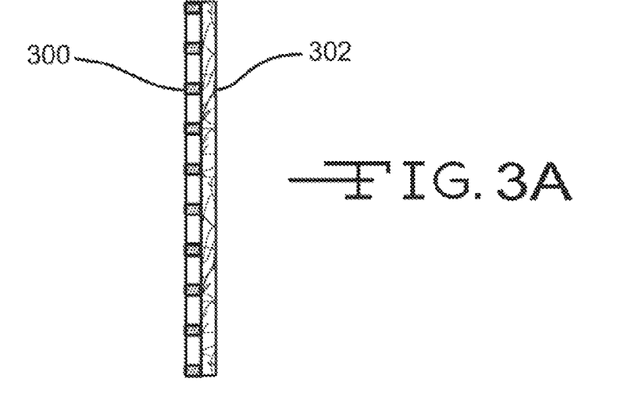
FIGS. 3A-3C illustrate cross section views of various configurations of an electrode or plate and a nonwoven fiber mat.
Figure 3B:
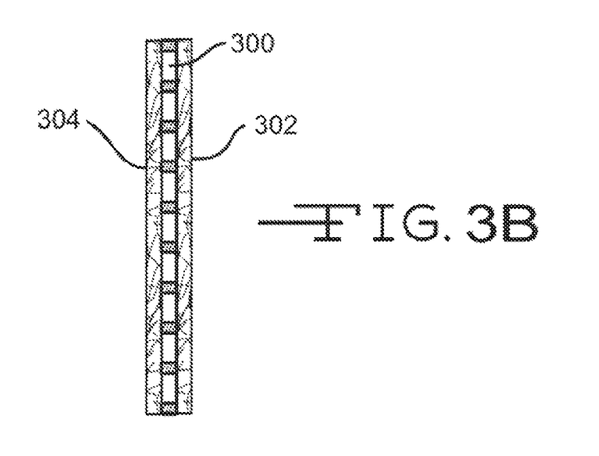
Figure 3C:
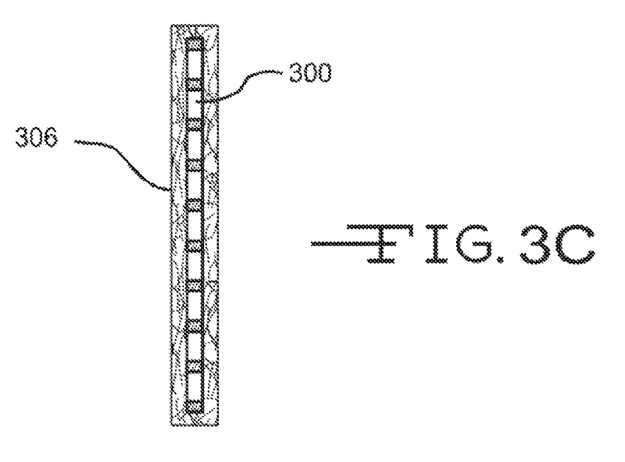

Positioned near a surface of negative electrode 212 is a nonwoven fiber mat 230 (referred to herein as a reinforcement mat). Reinforcement mat 230 is disposed partially or fully over the surface of negative electrode 212 so as to partially or fully cover the surface. As shown in FIGS. 3A-3C, a reinforcement mat 230 may be disposed on both surfaces of the negative electrode 212, or may fully envelope or surround the electrode. Likewise, although reinforcement mat 230 is shown on the outer surface of the electrode 212, in some embodiments reinforcement mat 230 may be positioned on the inner surface of the electrode 212 (i.e., adjacent separator 220). Reinforcement mat 230 reinforces the negative electrode 212 and provides an additional supporting component for the negative active material 214. The additional support provided by reinforcement mat 230 may help reduce the negative effects of shedding of the negative active material particles as the active material layer softens from repeated charge and discharge cycles. This may reduce the degradation commonly experienced by repeated usage of lead-acid batteries.

Reinforcement mat 230 is often impregnated or saturated with the negative active material 214 so that the reinforcement mat 230 is partially or fully disposed within the active material 214 layer. Impregnation or saturation of the active material within the reinforcement mat means that the active material penetrates at least partially into the mat. For example, reinforcement mat 230 may be fully impregnated with the negative active material 214 so that reinforcement mat 230 is fully buried within the negative active material 214 (i.e., fully buried within the lead paste). Fully burying the reinforcement mat 230 within the negative active material 214 means that the mat is entirely disposed within the negative active material 214. In one embodiment, reinforcement mat 230 may be disposed within the negative active material 214 up to about a depth X of about 20 mils (i.e., 0.020 inches) from an outer surface of the electrode 212. In other embodiments, the glass mat 230 may rest atop the negative active material 214 so that the mat is impregnated with very little active material. Often the reinforcement mat 230 will be impregnated with the negative active material 214 so that the outer surface of the mat forms or is substantially adjacent the outer surface of the electrode 212 (see reinforcement mat 240). In other words, the active material may fully penetrate through the reinforcement mat 230 so that the outer surface of the electrode 212 is a blend or mesh of active material and reinforcement mat fibers.

As described herein, reinforcement mat 230 includes a plurality of glass fibers, an acid resistant binder that couples the plurality of glass fibers together to form the reinforcement mat. Reinforcement mat 230 may have an area weight of between about 10 and 100 g/m$^2$, more often between about 20 and 60 g/m$^2$. Reinforcement mat 230 may be used for reinforcing a plate or electrode of a lead-acid battery and may include a relatively homogenous mixture of coarse glass fibers that may include a plurality of first glass fibers having a diameter between about 8-13 μm and a plurality of second fibers having a diameter of at least 6 μm. As used herein, relatively homogenous means that the mixture is at least 85% homogenous. In some embodiments the relatively homogenous mixture may make up between about 70-95% of the mass of the mat 230. In some embodiments, the homogenous mixture may also include 5-30% conductive fibers. For example, conductive fibers having diameters between about 6 and 8 μm and having lengths between about 8 and 10 mm can be included in the relatively homogenous mixture. The reinforcement mat 230 also includes an acid resistant binder that bonds the plurality of first and second glass fibers together to form the reinforcement mat 230. The reinforcement mat 230 further includes a wetting component that is applied to reinforcement mat 230 to increase the wettability/wickability of the reinforcement mat 230. The wettability/wickability of the reinforcement mat 230 may be increased such that the reinforcement mat 230 has or exhibits an average water wick height and/or water/acid solution wick height of at least 1.0 cm after exposure to the respective solution for 10 minutes in accordance with a test conducted according to method ISO8787.

Reinforcement mat 230 may include a conductive material so as to make reinforcement mat 230 electrically conductive. For example, a conductive layer may be formed on one or more sides of reinforcement mat 230 by applying a conductive material to at least one surface of reinforcement mat 230 or throughout reinforcement mat 230. The conductive layer may be positioned to face and contact electrode 212 to provide electrical pathways along which the electrons may flow. The conductive material contacts the electrode 212, and more specifically the active material of electrode 212 to enable electron flow on a surface or through reinforcement mat 230. The conductive material and/or layer of reinforcement mat 230 may have an electrical resistance of less than about 100,000 ohms per square and more commonly less than about 50,000 ohms per square so as to enable or enhance electron flow on the surface of the mat 230. In some embodiments, the conductive layer of reinforcement mat 230 may be electrically coupled with a negative terminal 218 to provide a route or path for current flow to terminal 218.

As described herein, electrons may flow along either reinforcement mat 230 or grid/conductor 216 depending on which conductive surface provides an electrical path of least electrical resistance. For example, electrons proximate to terminal 218 may flow along an electrical path of grid/conductor 216 while electrons distal to terminal 218 may flow along an electrical path of reinforcement mat 230 due to a buildup of lead sulfate on grid/conductor 216 at the distal location.

In one embodiment, the conductive layer of reinforcement mat 230 may be formed on a surface of electrically insulative fibers (e.g., glass fibers) by coating the conductive material onto the insulative fibers or by spraying the conductive material on the surface of reinforcement mat 230. In a specific example, the conductive material may be added to a primary binder material that is applied to the wet-laid insulative fibers to couple the fibers together. The primary binder/conductive material mixture and wet-laid insulative fibers may then be cured so that the conductive material completely coats or is saturated throughout reinforcement mat 230 to form the conductive layer. In another embodiment, reinforcement mat 230 may be manufactured in a standard process where a primary binder without the conductive material is applied to the wet-laid insulative fibers to couple the fibers together. The conductive material may then be dispersed in a secondary or dilute binder that is then coated or sprayed onto the surface of reinforcement mat 230. Reinforcement mat 230 may then be cured so that the conductive material forms a conductive layer across the entire surface, or a defined portion, of reinforcement mat 230. In this embodiment, a majority of the conductive material may be positioned atop the surface of reinforcement mat 230.

In another embodiment, a reinforcement mat 230 may be manufactured according to known processes. A catalyst may be subsequently added to a surface of reinforcement mat 230 and metal ions, such as copper, may be grown on the surface of the reinforcement mat via the applied catalyst. In still another embodiment, the conductive material may be added to reinforcement mat 230 via chemical vapor deposition processes.

In lead-acid battery environments, the conductive material used for reinforcement mat 230 should be relatively corrosion resistant due to the aggressive electrochemical environment of the battery. In some embodiments, the conductive material may include a metal, a nanocarbon, graphene, graphite, a conductive polymer (e.g., polyanilines), nanocarbons or carbon nanotubes, carbon fibers, copper, titanium oxides, vanadium oxides, tin oxides, and the like. In a specific embodiment, the conductive material may include carbon nano-platelets, such as graphene. The graphene may be added to the primary binder or secondary/dilute binder as described above and applied to reinforcement mat 230 (e.g., a glass or polyolefin fiber mat) between about 0.01% and 50% by weight, or in some embodiments between about 1% and 25% by weight. When cured, the coating of graphene forms a conductive layer across the entire surface, or a defined portion, of reinforcement mat 230.

In another embodiment, the conductive layer may comprise a conductive fiber mat, foil, or screen that is positioned adjacent the surface of reinforcement mat 230 or entangled with the electrically insulative fibers (e.g., glass fibers) of reinforcement mat 230. In one embodiment, the conductive layer may be made by coating or spraying the conductive fibers on the surface of reinforcement mat 230. In another embodiment, a conductive fiber mat may include a plurality of conductive fibers arranged in a non-woven or woven pattern and coupled together via a binder. The conductive fiber mat may be coupled with reinforcement mat 230 via a binder and the like. Electrons may flow along the conductive fiber mat, foil, or screen as described herein, such as up to negative terminal 218.

As briefly described above, reinforcement mat 230 may include a plurality of electrically insulative fibers, such as glass, polyolefin, polyester, and the like, which are primarily used to reinforce the electrode. Because the reinforcement mat 230 is made of such insulative fibers, the reinforcement mat 230 may be essentially non-conductive prior to or without the addition of the conductive material. For example, without combining or adding the conductive material/layer, the reinforcement mat 230 may have an electrical resistance greater than about 1 Megohm per square. In manufacturing the reinforcement mat 230, water or another liquid may be removed (e.g., via a vacuum) from a suspension of the fibers in the liquid medium. A binder may then be applied to the wet-laid non-woven glass or polyolefin fibers to form reinforcement mat 230. As described previously, in some embodiments, the conductive material or fibers may be added to the binder and/or to the liquid medium. In one embodiment, reinforcement mat 230 may have a thickness of between about 50 micrometers and about 500 micrometers and have an average pore size of between about 5 micrometers and about 5 millimeters.

The reinforcement mat 230 also includes a wetting component that is applied to the reinforcement mat to increase the wettability/wickability of the reinforcement mat. The wettability/wickability of the reinforcement mat 230 is increased so that the reinforcement mat has or exhibits an average water wick height and/or average water/solution wick height of at least 0.5 cm after exposure to the respective solution for 10 minutes in accordance with a test conducted according to method ISO8787.

As described herein, the wetting component may be a wettable component of the acid resistant binder (e.g., a hydrophilic functional group), a hydrophilic binder that is mixed with the acid resistant binder, the wetting component may be component fibers (e.g., cellulose or natural fibers) that are bonded with the glass fibers of the reinforcement mat 230, or the wetting component may be a wettable solution (e.g., starch or cellulose solution) that is applied to the reinforcement mat 230 such that the wettable solution saturates the reinforcement mat 230 or is disposed on at least one surface of the reinforcement mat 230 upon drying of the wettable solution. In some embodiments, the wetting component may include a combination of any of the aforementioned components, such as a combination of cellulose fibers and an acid resistant binder having a wettable component. In a specific embodiment, the glass fibers of reinforcement mat 230 include first fibers having fiber diameters between about 6 μm and about 30 μm, or 8 μm and about 12, μm and second fibers having fiber diameters of at least about 6 μm.

As described herein, in some embodiments the wetting component may be wettable component of the acid resistant binder (e.g., a hydrophilic functional group) or a hydrophilic binder that is mixed/combined with the acid resistant binder. In other embodiments, the wetting component may be a wettable solution (e.g. starch or cellulose solution) that is applied to the reinforcement mat 230 so that the wettable solution saturates the reinforcement mat 230 or is disposed on at least one surface of the reinforcement mat 230 after the wettable solution is dried. In still another embodiment, the wetting component may be a plurality of component fibers (e.g., cellulose, cotton, other natural fibers, polyester, other synthetic fibers, or a combination of natural and/or synthetic fibers) that are bonded with the reinforcement mat 230. According to one embodiment, the component fibers may form a component fiber mat that is bonded to at least one side of the glass reinforcement mat 230 such that the reinforcement mat 230 comprises a two layer mat configuration. In another embodiment, the component fibers may be mixed with the glass fibers such that upon forming the glass mat the component fibers are entangled with and bonded to the glass fibers. In yet other embodiments, the wetting component may be a combination of the above described wetting components (i.e., a binder having a wettable component, a wettable solution, and/or a component fiber).

Referring now to FIGS. 3A-C, illustrated are various electrode-reinforcement mat configurations. FIG. 3A illustrates a configuration where an electrode 300 has a single reinforcement mat 302 disposed on or near an outer surface. As described above, reinforcement mat 302 may include a conductive material and/or layer so as to enable electron flow on a surface and/or through reinforcement mat 302 to a battery terminal. Reinforcement mat 302 may also include a wetting component as described above to provide the mat 302 with enhanced wettability characteristics. Reinforcement mat 302 may partially or fully cover the outer surface of electrode 300. The configuration of FIG. 3B is similar to that of FIG. 3A except that an additional reinforcement mat 304 is disposed on or near an opposite surface of electrode 300 so that electrode 300 is sandwiched between the two glass mats, 302 and 304. Either or both reinforcement mats, 302 and 304, may include a conductive material and/or layer to enable electron flow to a battery terminal as well as a wetting component. As such, electrode 300 may be sandwiched between two conductive reinforcement mats 302 and 304. FIG. 3C illustrates a configuration where a reinforcement mat 306 envelopes or surrounds electrode 300. Although FIG. 3C illustrates the reinforcement mat 306 fully enveloping the electrode 300, in many embodiments a top side or portion of the mat 306, or a portion thereof, is open. Glass mat 306 may include the conductive material and/or layer as described above to enable electron flow as well as a wetting component.

Referring back to FIGS. 1 and 2, positioned near a surface of positive electrode 202 is a reinforcement mat 240. Reinforcement mat 240 may be arranged and/or coupled with positive electrode 202 similar to the arrangement and coupling of reinforcement mat 230 with respect to negative electrode 212. For example, reinforcement mat 240 may be disposed partially or fully over the surface of positive electrode 202 so as to partially or fully cover the surface, may be positioned on an inner surface of the electrode 202 (i.e., adjacent separator 220) instead of the shown outer surface configuration, and/or may be impregnated or saturated with the positive active material 204 so that the reinforcement mat 240 is partially or fully disposed within the active material 204 layer. Like reinforcement mat 230, reinforcement mat 240 also provides additional support to help reduce the negative effects of shedding of the positive active material particles due to repeated charge and discharge cycles.

In some embodiments, reinforcement mat 240 may include a conductive material and/or layer to enable electron flow on a surface and/or through reinforcement mat 240 to positive terminal 208. In such embodiments, electrons may flow along either reinforcement mat 240 or grid/conductor 206 depending on which conductive surface provides an electrical path of least electrical resistance. For example, electrons proximate to terminal 208 may flow along an electrical path of grid/conductor 206 while electrons distal to terminal 208 may flow along an electrical path of reinforcement mat 240. In some embodiments, reinforcement mat 230 and reinforcement mat 240 may both include a conductive material and/or layer to enable electron flow on or relative to both mats. Both reinforcement mat 230 and reinforcement mat 240 may include a wetting component as described herein.

With regarding to the reinforcement functions of reinforcement mats 230 and/or 240, in some embodiments the reinforcing aspects of these mats may be enhanced by blending fibers having different fiber diameters. Reinforcement mats 230 and 240 (referred to hereinafter as reinforcement mat 230) can have similar characteristics and compositions, and can include a blend of two or more different diameter coarse fibers. In one embodiment, reinforcement mat 230 includes a plurality of first coarse fibers, having fiber diameters ranging between about 6 μm and about 13 μm, between about 6 μm and about 11 μm, or between about 8 μm and about 13 μm. The first coarse fibers are blended with a plurality of second coarse fibers, having fiber diameters of at least about 6 μm, preferably between 6 μm and 7 μm. In some embodiments, the plurality of second coarse fibers may include a silane material sizing. The blend of the two or more different diameter coarse fibers results in a mat that is sufficiently strong to structurally support the active material as described above and to withstand the various plate manufacturing processes while also minimizing the thickness and overall size of the mat. Reducing the thickness of reinforcement mat 230 while maintaining mat strength may be desired since reinforcement mat 230 typically is a chemically inactive component and, thus, does not contribute to the battery's electrochemical process. Reducing the volume of reinforcement mat 230 helps minimize the battery's volume of non-electrochemically contributing components.

In one embodiment, reinforcement mat 230 includes a blend of between 10% and 95% of the first coarse fibers and between 5% and 80% of the second coarse fibers. In another embodiment, reinforcement mat 230 includes a blend of between 70% and 95% of the first coarse fibers and between 5% and 30% of the second coarse fibers. In another embodiment, reinforcement mat 230 includes a blend of between 40% and 90% of the first coarse fibers and between 5% and 30% of the second coarse fibers. In another embodiment, reinforcement mat 230 includes a blend of between 10% and 20% of the first coarse fibers and between 60% and 80% of the second coarse fibers. In yet another embodiment, the blend of first coarse fibers and second coarse fibers is approximately equal (i.e., 50% of the first and second coarse fibers).

The length of the coarse fibers may also contribute to the overall strength of reinforcement mat 230 by physically entangling with adjacent fibers or fiber bundles and/or creating additional contact points where separate fibers are bonded via an applied binder. In one embodiment, the first and second coarse fibers have fiber lengths that range between about 1/23 inch and about 1½ inches, although an upper length limit of 1¼ inch is more common. This range of lengths provides sufficient mat strength while allowing the fibers to be dispersed in a white water solution for mat processing applications. In another embodiment, the first and second coarse fibers have fiber lengths that range between ½ and ¾ of an inch. The fibers lengths of the first coarse fibers may be different than the fibers lengths of the second coarse fibers. For example, in one embodiment, the first fibers may have an average fiber length of about ⅓ inch while the second coarse fibers have an average fiber length of about ¾ inch. In one embodiment, either or both the first or second coarse fibers have an average fiber length of at least ⅓ inch, while in another embodiment, either or both the first or second coarse fibers have an average fiber length of at least ½ inch.

The type and amount of binder used to bond the first and second coarse fibers together may also contribute to the overall strength and thickness of reinforcement mat 230. As described above, the binder is generally an acid and/or chemically-resistant binder that delivers the durability to survive in the acid environment throughout the life of the battery, the strength to survive the plate pasting operation, and the permeability to enable paste penetration. For example, the binder may be an acrylic binder, a melamine binder, a UF binder, or the like. The binder may also include and bond the conductive material to the first and/or second coarse fibers. Increased binder usage may reduce the thickness of reinforcement mat 230 by creating more fiber bonds and densifying reinforcement mat 230. The increased fibers bonds may also strengthen reinforcement mat 230. In one embodiment, the binder is applied to the first and second coarse fibers such that the binder comprises between about 5% and 45% by weight of the reinforcement mat 230 or between about 15% and 35% by weight of the reinforcement mat. In another embodiment, the binder is applied to the first and second coarse fibers such that it comprises between about 5% and 30% by weight of the reinforcement mat 230.

As described herein, the conductive material may be mixed with the binder or a secondary binder and applied to the first and/or second coarse fibers during manufacture of the reinforcement mat 230 or subsequent thereto. For example, the binder may include conductive fibers (e.g., carbon fibers) and/or other conductive material (e.g., graphite). In some embodiments, the binder may include between about 5-30% graphite particles. The resulting reinforcement mat 230 may have an electrical resistance of less than about 100,000 ohms per square, and more commonly less than about 50,000 ohms per square, to enable electron flow on a surface of, or through, the reinforcement mat.

The wetting component may be mixed with the binder in some embodiments. The resulting reinforcement mat 230 may have or exhibit an average water wick height of at least 0.5 cm after exposure to water for 10 minutes conducted according to method ISO8787. The wetting component is dissolvable in an acid solution of the lead-acid battery such that a significant portion of the nonwoven fiber mat is lost due to dissolving of the wetting component. For example, between about 5-85% of the mass of the reinforcement mat 230 may be lost.

The above described reinforcement mat 230 configurations provide mats having a total tensile strength of at least 30 lbs/3 inch and more commonly at least 35 lbs/3 inch. Specifically, the reinforcement mat 230 has a tensile strength in the machine direction of at least 22 lbs/3 inch and a tensile strength in the cross-machine direction of at least 13 lbs/3 inch. The above described mats have been found to have sufficient strength to support the active material and to withstand the various stresses imposed during plate or electrode manufacturing and processing (e.g., pasting or applying the active material). Reinforcement mat 230 that do not have the above described tensile strength attributes may not be sufficiently strong to support the applied active material (e.g., prevent shedding and the like) and/or may pose processing issues, such as mat breakage when applying the active material (e.g., lead or lead oxide) paste on the glass mat during the plate reinforcement process.

Further, the above described reinforcement mat 230 configuration provide mats that have a thickness of 10 mils or less (i.e., 0.010 inches) and more commonly 9 mils or less (0.009 inches). In one embodiment, the reinforcement mat 230 have a thickness in the range of between about 6 and 8 mils (i.e., 0.006 and 0.008 inches), and preferably about 7 mils. These mats occupy minimal space within the electrode and battery interior, which allows for additional electrochemically active materials (e.g., additional electrolyte and/or lead or lead oxide paste) to be included in the battery, thereby increasing the life and efficiency of the battery. The above described mats have the unique combination of both minimal size or thickness and strength while also being electrically conductive. The mats may also have a pore size that ranges between 50 microns-5 mm.

In some embodiments, separator 220 may have a similar composition as reinforcement mat 230 and may be particularly useful in AGM batteries. For example, separator 220 may be made of glass fibers, or various polymers, such as polyethylene, poly propylene, and the like. In some embodiments, the separator 220 may include nonwoven fibers. The separator 220 may be a nonwoven fiber mat. In some embodiments, a reinforcement mat 250 may be positioned adjacent the separator 220. Separator 220 may have an area weight of between about 100 and 400 g/m$^2$. More often, separator 220 has an area weight of between about 150 and 300 g/m². The separator 220 may be a mat formed from a combination of coarse glass fibers. For example, separator 220 may include a mixture of between about 10-20% of a plurality of first glass fibers having diameters of between about 8 and 13 μm and between about 60-80% of a plurality of second glass fibers having diameters at least 6 μm. The plurality of second glass fibers may include a silane material sizing. Separator 220 may also include an acid resistant binder that bonds the first and second plurality of glass fibers to form the separator 220. The binder can be an acrylic binder, melamine binder, UF binder, or the like. In some embodiments, the separator 220 may include between about 70-95% of the mixture of coarse glass fibers. In some embodiments, separator 220 may include 5-30% of an acrylic binder.

In some embodiments, reinforcement mat 250 may also include a conductive material and/or layer to enable electron flow on a surface and/or through reinforcement mat 250 to positive terminal 208 and/or negative terminal 218. For example, the fiber mat or mats of reinforcement mat 250 may include a conductive material and/or layer, such as within the binder of the mats, as a film, mat, or layer of conductive fibers, and/or in accordance with any embodiment described herein. For example, the binder may include conductive fibers (e.g., carbon fibers) and/or other conductive materials (e.g., graphite). In such embodiments, electrons may flow along reinforcement mat 230, grid/conductor 216, reinforcement mat 240, grid/conductor 206, separator 220, and/or reinforcement mat 250 depending on which conductive path provides the least electrical resistance. For example, electrons proximate to grid/conductor 216 may flow along grid/conductor 216 and/or reinforcement mat 230 to terminal 218 while electrons proximate to separator 220 flow along an electrical path of separator 220 to terminal 218. Similarly, electrons proximate to grid/conductor 206 may flow along grid/conductor 206 and/or reinforcement mat 240 to terminal 208 while electrons proximate to separator 220 flow along an electrical path of separator 220 to terminal 208. In such embodiments, the available or possible electron paths may be greatly increased. In embodiments where the separator includes conductive materials, there is a nonconductive layer and/or other nonwoven nonconductive mat positioned against the conductive portion of the separator. In embodiments not utilizing another nonwoven nonconductive mat, the conductive material in the separator may be positioned on or near a surface of the separator such that at least one nonconductive layer extends through a center of the separator.

In some embodiments, reinforcement mat 250 may also include a wetting component. For example, reinforcement mat 250 may include 10-40% of cotton fibers, such as cotton microfibers having diameters of between about 0.5 and 3.0 μm. The wetting component may increase the wettability/wickability of the reinforcement mat 250 such that the reinforcement mat 250 has or exhibits an average water wick height and/or water/acid solution wick height of at least 1.0 cm after exposure to the respective solution for 10 minutes in accordance with a test conducted according to method ISO8787.

Processes and Methods

Figure 4:
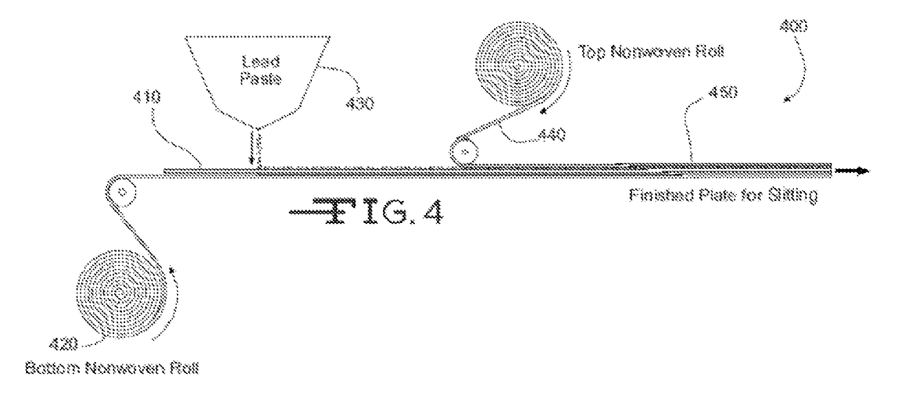
FIG. 4 illustrates a process for preparing an electrode or plate having a nonwoven fiber mat disposed on or near a surface of the electrode or plate.

Referring now to FIG. 4, illustrated is a process 400 for manufacturing an electrode. The process may involve transporting a lead alloy grid 410 on a conveyor toward an active material 430 applicator (e.g., lead or lead oxide paste applicator), which applies or pastes the active material 430 to the grid 410. A nonwoven mat roll 420 may be positioned below grid 410 so that a reinforcement mat is applied to a bottom surface of the grid 410. The reinforcement mat may include a conductive material and/or layer, as well as a wetting component, as described herein. In some embodiments, the reinforcement mat may also include a blend of coarse fibers as described herein. In some embodiments, the reinforcement mat may also include a blend of coarse and micro glass fibers in addition to the wetting component as described herein. A second nonwoven mat roll 440 may be positioned above grid 410 so that a second reinforcement mat is applied to a top surface of the grid 410. The second reinforcement mat may also include a conductive material, a wetting component, and/or layer and/or blend of coarse fibers and/or microfibers (similar to or different from reinforcement mat 420). The resulting electrode or plate 450 may subsequently be cut to length via a plate cutter (not shown). As described herein, the active material 430 may be applied to the grid 410 and/or top and bottom of reinforcement mats, 440 and 420, so that the active material impregnates or saturates the mats to a desired degree. The electrode or plate 450 may then be dried via a dryer (not shown) or other component of process 400. As described herein, the reinforcement mats, 440 and 420, may aid in the drying of the electrode or plate 450 by wicking the water and/or water/acid solution from the electrode or plate 450 so as to allow the water and/or water/acid solution to evaporate.

Figure 5:
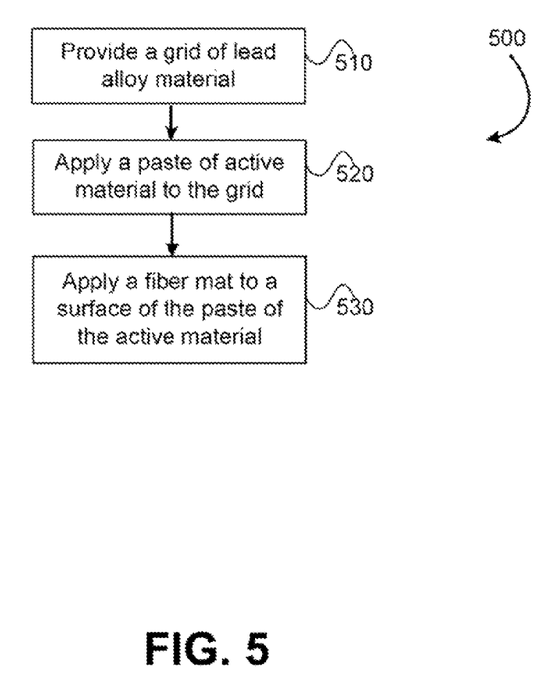
FIG. 5 illustrates a method of manufacturing a plate of a lead-acid battery.

Referring now to FIG. 5, illustrated is a method 500 of manufacturing a plate of a lead-acid battery. At block 510, a grid of lead alloy material is provided. The grid of lead alloy material may be either for a positive electrode (e.g., grid/conductor 206) or a negative electrode (e.g., grid/conductor 216) of a battery. At block 520, a paste of active material is applied to the grid of lead alloy material to form a battery plate or electrode (i.e., negative or positive electrode). At block 530, a nonwoven fiber mat is applied to a surface of the paste of the active material such that the nonwoven fiber mat is disposed at least partially within the paste of active material. As described herein, the nonwoven fiber mat may include a plurality of fibers, a binder material that couples the plurality of fibers together, a wetting component, and a conductive material disposed at least partially within the nonwoven fiber mat so as to contact the paste of active material. The wetting component may provide a wicking capability to allow a complete wetting of the electrodes of a lead-acid battery. The conductive material may be any material described herein and/or a conductive layer that is formed on the nonwoven fiber mat. The nonwoven fiber mat may have an electrical resistant of less than about 100,000 ohms per square to enable electron flow on a surface of the nonwoven fiber mat. In some embodiments, the nonwoven fiber mat may be disposed within the paste of active material between about 0.001 inches and about 0.020 inches.

In some embodiments, the method may also include applying a second nonwoven fiber mat to an opposite surface of the paste of active material so that the grid of lead alloy material is disposed between two nonwoven fiber mats. The second nonwoven fiber mat may also contain a conductive material that is disposed at least partially within the second nonwoven fiber mat so as to contact the paste of active material. In some embodiments, the nonwoven fiber mat may have a thickness of 0.009 inches or less and/or a tensile strength of at least 30 lbs/3 inch.

In some embodiments, the plurality of fibers may include a blend of coarse fibers as previously described. For example, the plurality of fibers may include first fibers having fiber diameters between about 8 μm and about 13 μm and second fibers having fiber diameters of at least about 6 μm. In some embodiments, the binder may include the conductive material. The binder may be applied to the mat between about 5% and 45% by weight, between about 20% and 30% by weight, and the like. In some embodiments, the conductive material may include a plurality of conductive fibers that are entangled with fibers of the nonwoven fiber mat.

Figure 6:
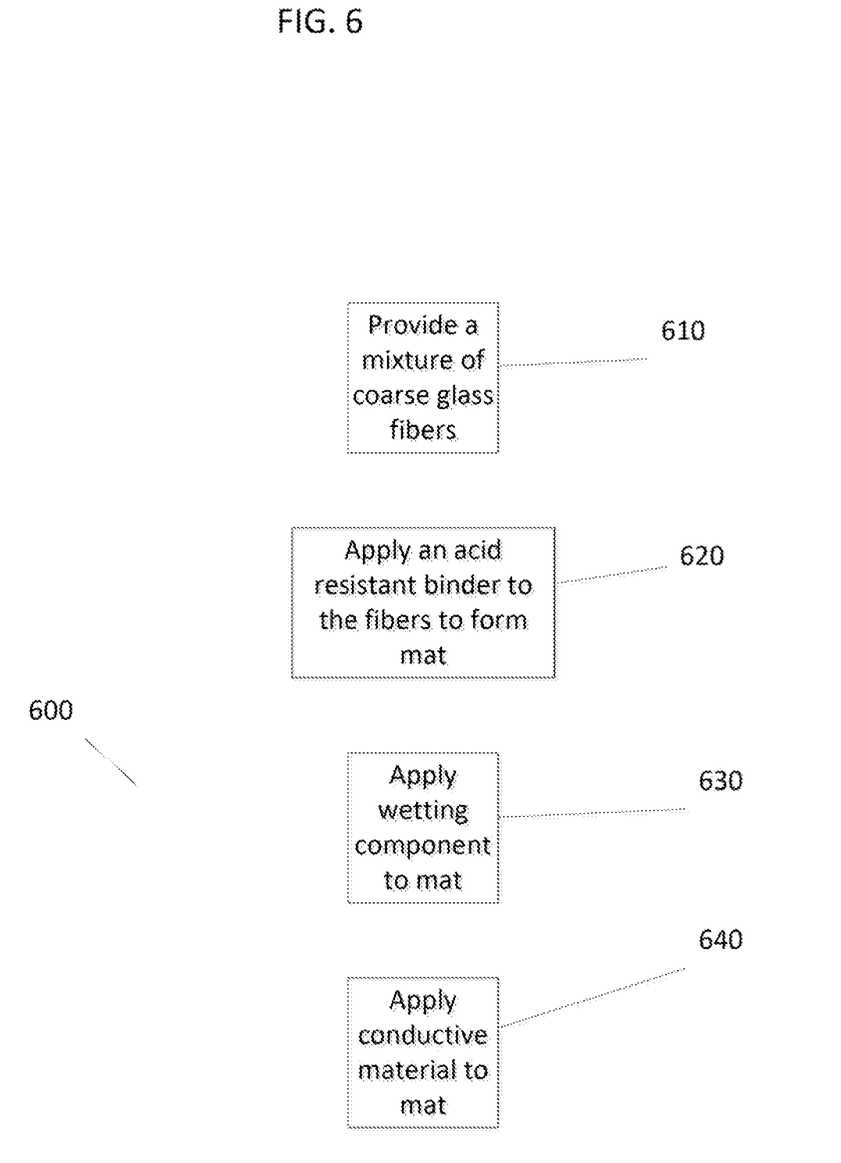
FIG. 6 illustrates a method of manufacture of a nonwoven fiber mater according to embodiments of the invention.

Referring now to FIG. 6, illustrated is an embodiment of a method 600 of manufacturing a nonwoven fiber mat for reinforcing a plate or electrode of a lead-acid battery (hereinafter reinforcement mat). The method described here can be used to produce reinforcement mats for both flooded lead-acid batteries and for separators in AGM batteries. At block 610, a plurality of glass fibers are provided. The glass fibers may be coarse fibers, microfibers, or a combination of coarse and microfibers. At block 620, an acid resistant binder is applied to the plurality of glass fibers to couple the plurality of glass fibers together to form the reinforcement mat. At block 630, a wetting component is added to the glass fibers and/or reinforcement mat to increase the wettability/wickability of the reinforcement mat. As described herein, the wettability/wickability of the reinforcement mat may be increased such that the reinforcement mat has or exhibits an average water wick height and/or average water/acid solution wick height of at least 0.5 cm after exposure to the respective solution for 10 minutes in accordance with the test conducted according to method ISO8787. A conductive material may be applied to the glass fibers and/or reinforcement mat at block 640. Applying the conductive material may include providing a layer of conductive fibers and/or other conductive materials and positioning this layer atop the glass mat. The conductive material may also include a coating that is applied to the mat. In some embodiments, the conductive material may be added to a binder that is applied to the fiber mat. In other embodiments, the conductive material may include conductive fibers that are disposed at least partially within and/or entangled with the fiber mat.

In some embodiments, applying the wetting component includes applying the acid resistant binder, where the acid resistant binder includes a conductive material and/or a wettable component (e.g., a hydrophilic functional group, a hydrophilic and acid resistant binder mixture, and the like) that functions to increase the wettability/wickability of the nonwoven fiber mat. In another embodiment, applying the wetting component includes applying a wettable solution (e.g., starch or cellulose solution and the like) to the reinforcement mat such that the wettable solution saturates the reinforcement mat or is disposed on at least one surface of the reinforcement mat upon drying of the wettable solution.

In yet another embodiment, applying the wetting component includes bonding a plurality of component fibers (e.g., cellulose fibers and the like) with the plurality of glass fibers of the reinforcement mat. In such embodiments, the reinforcement mat may include between about 40-95% of the glass fibers and up to 50% of the cellulose fibers, and more commonly between about 10-40% of the cellulose fibers. In a specific embodiment, the reinforcement mat may include between about 60-80% of the glass fibers and 10-40% of the cellulose fibers. In still further embodiments, applying the wetting component may include applying any combination of the wetting components described herein, such as the component fibers, wettable solution, and/or acid resistant binder having a wettable component.

In some embodiments, the plurality of glass fibers may include first glass fibers having fiber diameters between about 8 μm and about 30 μm. In such embodiments, the method 600 may further include providing a plurality of second glass fibers having fiber diameters between about 0.01 μm and about 5 μm and bonding the plurality of second glass fibers with the first glass fibers via the acid resistant binder. The addition of the second glass fibers may increase the wettability/wickability of the reinforcement mat such that the reinforcement mat has or exhibits an average water wick height and/or an average water/acid solution wick height of at least 1.0 cm after exposure to the respective solution for 10 minutes in accordance with the test conducted according to method ISO8787. In some embodiments, component fibers (e.g., cellulose fibers and the like) may be bonded with the plurality of first glass fibers and the plurality of second glass fibers. In such embodiments, the reinforcement mat may include between about 40-80% of the first glass fibers, 10-50% of the second glass fibers, and 5-40% of the cellulose fibers. In another embodiment, the reinforcement mat may include between about 40-50% of the first glass fibers, 20-30% of the second glass fibers, and 20-30% of the cellulose fibers.

Examples

Two reinforcement mats were prepared according to the embodiments described herein. The resistance of the mats was then measured. The methods of manufacturing the mats and the results are provided below.

1. Reinforcement Mat Using Graphene as a Conductive Coating

To produce the grapheme conductive coating, a suspension mixture was prepared using graphene (xGnP-M-15 from XG Sciences) and an acrylic binder (RHOPLEX™ HA-16 from Dow Chemical). The suspension mixture was prepared such that it contained approximately 0.5% binder and 1.5% graphene. A spray gun was then used to apply the mixture to a glass mat (Dura-Glass® mat PR-9 and B-10). The mat was then dried at 125 C for approximately 1 hr and cured at 175 C for approximately 3 mins. The surface resistance was then measured and the results are provided in Table 1 below.

TABLE 1

Reinforcement Mat Using Graphene as a Conductive Coating

| Sample | Surface resistance (K-Ohm) | Sample length (cm) | Sample width (cm) | Surface resistivity (K-Ohm/sq.) | Weight before coating (g) | Graphene % |
|---|---|---|---|---|---|---|
| B-10 (1) | 1.84 | 14.3 | 12.2 | 1.6 | 0.7609 | 15.8% |
| B-10 (2) | 3.41 | 14.2 | 12.2 | 2.9 | 0.7643 | 14.5% |
| B-10 (3) | 2.25 | 14.2 | 11.9 | 1.9 | 0.7334 | 17.3% |
| PR-9 (1) | 13.76 | 14.2 | 12 | 11.6 | 0.4577 | 10.1% |
| PR-9 (2) | 18.26 | 14.2 | 12.3 | 15.8 | 0.4651 | 11.7% |
| PR-9 (3) | 5.29 | 14.7 | 12.2 | 4.4 | 0.4728 | 8.9% |

By using the graphene material, a significant weight loss of the coating after a standard acid test (40 wt. % sulfuric acid, 70 C for 72 hrs) was not exhibited or experienced. As such, the graphene coated glass mats experience similar weight loss as uncoated glass mats. However, a slight drop in conductivity was observed after the mat was exposed to sulfuric acid for an extended time. This slight drop in conductivity may indicate reaction between the graphene and sulfuric acid.

2. Reinforcement Mat Using CNS (Carbon Nanostructure) as a Conductive Coating

To produce the CNS conductive coating, a suspension mixture was prepared using CNS (from Applied Nanostructured Solutions LLC) and/or an acrylic binder (RHOPLEX™ HA-16 from Dow Chemical). The suspension mixture was prepared such that it contained approximately 1% binder (or no binder) and 0.5% CNS. A glass mat (Dura-Glass® mat PR-9 or uncoated polyester spunbond mat) was placed in the mixture and water was vacuumed out. A uniform coating of the CNS was obtained. The mat was then dried at 125 C for approximately 1 hr and cured at 175 C for approximately 3 mins. The surface resistance was then measured and the results are provided in Table 2 below.

TABLE 2

Reinforcement Mat Using CNS (Carbon Nanostructure) as a Conductive Coating

| Sample | Surface resistance (Ohm) | Sample length (inch) | Sample width (inch) | Surface resistivity (Ohm/sq.) | CNS % | Comment |
|---|---|---|---|---|---|---|
| PR-9 (1) | 180 | 14 | 12 | 154.3 | 2.50% | With binder |
| PR-9 (2) | 65 | 14 | 14 | 65.0 | 15% | Without binder |
| PR-9 (3) | 53 | 14 | 14 | 53.0 | 25% | With binder |
| PR-9 (4) | 50 | 14 | 14 | 50.0 | 15% | Without binder |
| PR-9 (5) | 66 | 14 | 14 | 66.0 | 25% | Without binder |
| Polyester (1) | 239 | 13.5 | 13.5 | 239.0 | 0.3% | With binder |
| Polyester (2) | 68 | 13.5 | 13.5 | 68.0 | 2% | With binder |
| Polyester (2) | 132 | 13.5 | 13.5 | 132.0 | 0.66% | With binder |

By using the CNS material, a significant weight loss of the coating after a standard acid test (40 wt. % sulfuric acid, 70 C for 72 hrs) was not exhibited or experienced. As such, the CNS coated glass mats experience similar weight loss as uncoated glass mats. In addition, a significant drop in conductivity was not observed after the mat was exposed to sulfuric acid for an extended time. It is believed that since the CNS has the structure of a "crosslinked matrix of carbon nanotubes," even though sulfuric acid attacks some carbon, the whole structure remains connected and, thus, the conductivity of the coating is not affected. Given these results, CNS may be a better choice as a conductive coating than graphene. Further, the CNS coating provides a much better conductivity (i.e., less resistance) than graphene on non-woven mats. For example, as shown in Table 1, K-ohm units are used for graphene resistance, whereas in Table 2, Ohm units are used for CNS resistance.

Several reinforcement mats were manufactured in accordance with the embodiments described herein and tested to determine the wettability/wickability of the mats. The wettability/wickability tests were conducted according to method ISO8787. The mats were exposed to both a water solution and a water/acid solution where the concentration of sulfuric acid was approximately 40%. The results of the tests are shown in Table 3 below.

TABLE 3

Sample Reinforcement Mat

| Sample ID | Sample description | Binder | Average water wicking height after 10 mins (cm) | Std Dev | Average acid wicking (40%) height after 10 mins (cm) | Std Dev |
|---|---|---|---|---|---|---|
| Control | 100% coarse glass fibers | RHOPLEX™ HA-16 | 0.0 | 0 | 0.0 | 0.0 |
| 1 | 50% ¾" K249 T, 50% cellulose | RHOPLEX™ HA-16 | 0.8 | 0.15 | 1.2 | 0.12 |
| 2 | 50% ¾" K249 T, 50% cellulose | Hycar® FF 26903 | 0.9 | 0.15 | 0.9 | 0.15 |
| 3 | 50% ¾" K249 T, 25% cellulose, 25% 206-253 | Hycar® FF 26903 | 2.7 | 0.05 | 1.9 | 0.25 |

A control mat was also manufactured and tested to provide a comparison or reference point for the other tested mats. The control mat includes 100% coarse glass fibers (T glass fibers) having an average fiber length of approximately ¾" and an average fiber diameter of approximately 13 µm. The glass fibers were bonded together with an acid resistant binder sold by Dow Chemical under the trade name RHOPLEX™ HA-16. The acid resistant binder was applied so as to have a Loss on Ignition (LOI) of approximately 20%. The control mat exhibited an average water wicking height and an average acid wicking height of approximately 0.0 cm after exposure to the respective solutions for 10 minutes. Stated differently, the control mat exhibited essentially no wettability/wickability.

A first mat (i.e. Sample ID 1) was manufactured to include approximately 50% coarse glass fibers having an average fiber length of approximately ¾" and an average fiber diameter of approximately 13 µm and to include 50% cellulose fibers having an average fiber length of approximately 2.40 mm. The cellulose fibers were made from a pulp slurry by pre-soaking a Kraft board in water (e.g., Kamloops Chinook Kraft board manufacture by Domtar) and stirring the soaked Kraft board in water for at least 10 minutes. The cellulose fiber pulp slurry was then combined with the glass fibers. The coarse glass fibers and cellulose fibers were bond together with the RHOPLEX™ HA-16 binder so as to have an LOI of approximately 20%. The first mat exhibited an average water wicking height of approximately 0.8 cm with a standard deviation of 0.15 after exposure to the water solution for 10 minutes. The first mat also exhibited an average water/acid solution wicking height of approximately 1.2 cm with a standard deviation of 0.12 after exposure to the water/acid solution for 10 min.

A second mat (i.e. Sample ID 2) was manufactured to include approximately 50% coarse glass fibers and 50% cellulose fibers having fiber properties similar to the first mat. The coarse glass fibers and cellulose fibers were bond together with an acid resistant binder sold by Lubrizol under the trade name Hycar® FF 26903. The binder was applied so as to have an LOI of approximately 20%. The second mat exhibited an average water wicking height of approximately 0.9 cm with a standard deviation of 0.15 after exposure to the water solution for 10 minutes. The second mat also exhibited an average water/acid solution wicking height of approximately 0.9 cm with a standard deviation of 0.15 after exposure to the water/acid solution for 10 min.

A third mat (i.e. Sample ID 3) was manufactured to include approximately 50% coarse glass fibers and 25% cellulose fibers having fiber properties similar to the first and second mats. The third mat also included approximately 25% glass microfibers having an average fiber diameter of approximately 0.76 μm (i.e., Johns Manville 206-253 fibers). The coarse glass fibers, glass microfibers, and cellulose fibers were bond together with the Hycar® FF 26903 binder so as to have an LOI of approximately 20%. The third mat exhibited an average water wicking height of approximately 2.7 cm with a standard deviation of 0.05 after exposure to the water solution for 10 minutes. The third mat also exhibited an average water/acid solution wicking height of approximately 1.9 cm with a standard deviation of 0.25 after exposure to the water/acid solution for 10 min.

As shown in the test results above, the addition of the wetting component to the reinforcement mat, which in this case included cellulose fibers, significantly increased the wettability/wickability of the reinforcement mat. Further, the inclusion of glass microfibers in the reinforcement mat in addition to the wetting component significantly increased the wettability/wickability of the reinforcement mat beyond that exhibited by adding the wetting component alone.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lead-acid battery comprising:
    a positive electrode;
    a negative electrode;
    a separator positioned between the positive electrode and the negative electrode so as to electrically insulate the positive and negative electrodes; and
    a nonwoven fiber mat positioned adjacent the positive electrode or the negative electrode, the nonwoven fiber mat comprising: a relatively homogenous mixture of coarse glass fibers comprising:
        a plurality of first glass fibers having diameters between about 8 μm to 13 μm; and
        a plurality of second glass fibers having diameters of at least 6 μm, the plurality of second glass fibers comprising a silane material sizing;
    an acid resistant binder that bonds the plurality of first and second glass fibers to form the nonwoven fiber mat;
    a wetting component applied to the nonwoven fiber mat to increase the wettability of the nonwoven fiber mat such that the nonwoven fiber mat has or exhibits an average water wick height of at least 1.0 cm after exposure to water for 10 minutes conducted according to method ISO8787, wherein the wetting component comprises fibers having a diameter of between about 0.5 μm and about 3 μm; and
    a conductive material disposed on at least one surface of the nonwoven fiber mat or throughout the nonwoven fiber mat such that when the nonwoven fiber mat is positioned adjacent the positive or negative electrode, the conductive material contacts the positive or the negative electrode, the nonwoven fiber mat having an electrical resistance of less than about 100,000 ohms per square to enable electron flow about the nonwoven fiber mat, wherein the conductive material comprises conductive fibers having a diameter of between about 6 μm and about 10 μm, the fibers having a length of between about 8 mm and 12 mm.

2. The lead-acid battery according to claim 1, wherein the mixture of coarse glass fibers comprise between about 10% to 95% of the first glass fibers and between about 5% to 80% of the second glass fibers.

3. The lead-acid battery according to claim 1, wherein the nonwoven fiber mat has an area weight of between about 10 g/m² and about 100 g/m².

4. The lead-acid battery according to claim 1, wherein the wetting component comprises one or more of cotton fibers, cellulose fibers, or polyester fibers that are bonded with the nonwoven fiber mat.

5. The lead-acid battery according to claim 4, wherein the one or more of cotton fibers, cellulose fibers, or polyester fibers form a mat that is bonded to at least one side of the nonwoven fiber mat.

6. The lead-acid battery according to claim 4, wherein the one or more of cotton fibers, cellulose fibers, or polyester fibers are entangled with the mixture of coarse glass fibers to form the nonwoven fiber mat.

7. The lead-acid battery according to claim 4, wherein the one or more of cotton fibers, cellulose fibers, or polyester fibers are entangled with the mixture of coarse glass fibers to form the nonwoven fiber mat.

8. The lead-acid battery according to claim 1, wherein the conductive material comprises a plurality of carbon fibers that are entangled with the mixture of coarse glass fibers of the nonwoven fiber mat.

9. The lead-acid battery according to claim 1, wherein the nonwoven fiber mat is affixed to a polyethylene separator, a phenol saturated paper separator, or an AGM separator.

10. A nonwoven fiber mat for a lead-acid battery, the nonwoven fiber mat comprising:
a relatively homogenous mixture of coarse glass fibers comprising:
a plurality of first glass fibers having diameters between about 8 μm to 13 μm; and
a plurality of second glass fibers having diameters of at least 6 μm, the plurality of second glass fibers comprising a silane material sizing;
an acid resistant binder that bonds the plurality of first and second glass fibers to form the nonwoven fiber mat;
a wetting component applied to the nonwoven fiber mat to increase the wettability of the nonwoven fiber mat such that the nonwoven fiber mat has or exhibits an average water wick height of at least 1.0 cm after exposure to water for 10 minutes conducted according to method ISO8787, wherein the wetting component comprises fibers having a diameter of between about 0.5 μm and about 3 μm; and
a conductive material disposed on at least one surface of the nonwoven fiber mat or throughout the nonwoven fiber mat such that when the nonwoven fiber mat is positioned adjacent a positive or a negative electrode of a lead-acid battery, the conductive material contacts the positive or negative electrode, the nonwoven fiber mat having an electrical resistance of less than about 100,000 ohms per square to enable electron flow about the nonwoven fiber mat, wherein the conductive material comprises conductive fibers having a diameter of between about 6 μm and about 10 μm, the fibers having a length of between about 8 mm and 12 mm.

11. The nonwoven fiber mat according to claim 9, wherein the nonwoven fiber mat has an area weight of between about 10 g/m² and about 100 g/m².

12. The nonwoven fiber mat according to claim 9, wherein the wetting component comprises cotton fibers having diameters between about 0.1 μm to 10 μm.

13. The nonwoven fiber mat according to claim 9, wherein the nonwoven fiber mat comprises between about 70% to 95% of the mixture of coarse glass fibers and between about 5% to 30% of the binder.

14. The nonwoven fiber mat according to claim 9, wherein the mixture of coarse glass fibers comprise between about 10% to 95% of the first glass fibers and between about 5% to 80% of the second glass fibers.

15. The nonwoven fiber mat according to claim 9, wherein the conductive material further comprises carbon fibers that are between about 8 mm to 12 mm in length and having diameters between about 6 μm to 10 μm.

16. The nonwoven fiber mat according to claim 9, wherein the binder comprises one or more of acrylic, melamine, phenolic, or urea formaldehyde binders.

17. A method of manufacturing a nonwoven fiber mat for use in a lead-acid battery, the method comprising: providing a mixture of coarse glass fibers comprising:
a plurality of first glass fibers having diameters between about 8 μm to 13 μm; and
a plurality of second glass fibers having diameters of at least 6 μm, the plurality of second glass fibers comprising a silane material sizing; applying an acid resistant binder to the mixture of coarse glass fibers to couple the mixture of coarse glass fibers together to form the nonwoven fiber mat;
applying a conductive material to at least one surface of the nonwoven fiber mat or throughout the nonwoven fiber mat such that when the nonwoven fiber mat is positioned adjacent a positive or a negative electrode of a battery, the conductive material contacts the positive or the negative electrode, the nonwoven fiber mat having an electrical resistance of less than about 100,000 ohms per square so as to enable electron flow about the nonwoven fiber mat wherein the conductive material comprises conductive fibers having a diameter of between about 6 μm and about 10 μm, the fibers having a length of between about 8 mm and 12 mm; and
applying a wetting component to the nonwoven fiber mat to increase the wettability of the nonwoven fiber mat such that the nonwoven fiber mat has or exhibits an average water wick height of at least 0.5 cm after exposure to water for 10 minutes conducted according to method ISO8787, wherein the wetting component comprises fibers having a diameter of between about 0.5 μm and about 3 μm.

18. The method of claim 16, wherein the significant portion of the nonwoven fiber mat that is lost due to dissolving of the wetting component comprises between about 5-85% of the mass of the nonwoven fiber mat.

19. The method of claim 16, wherein applying the wetting component comprises bonding one or more of cotton fibers, cellulose fibers, or polyester fibers with the mixture of coarse glass fibers of the nonwoven fiber mat.

20. The method of claim 16, wherein the conductive material comprises one or more of graphite fibers or carbon fibers.

* * * * *